(12) United States Patent
Moy et al.

(10) Patent No.: US 6,179,264 B1
(45) Date of Patent: Jan. 30, 2001

(54) ROLLING BASE STAND FOR COMPUTER MONITORS AND OTHER APPLIANCES

(75) Inventors: Millicent Amanda Moy; Rafael Calderon, both of San Diego, CA (US)

(73) Assignees: Sony Corporation, Tokyo (JP); Sony Electronics Inc., Park Ridge, NJ (US)

( * ) Notice: Under 35 U.S.C. 154(b), the term of this patent shall be extended for 0 days.

(21) Appl. No.: 09/359,541

(22) Filed: Jul. 22, 1999

(51) Int. Cl.[7] .................................................. A47B 95/00
(52) U.S. Cl. .................. 248/349.1; 188/1.12; 312/223.2
(58) Field of Search .......................... 248/349.1, 346.01, 248/346.06, 346.11, 424, 128, 129; 188/1.12; 312/223.2, 351.1

(56) References Cited

U.S. PATENT DOCUMENTS

| | | | |
|---|---|---|---|
| 285,967 | * 10/1883 | Chapman | 248/129 X |
| 2,456,218 | * 12/1948 | Semisch | 248/346.01 X |
| 5,244,062 | * 9/1993 | Felton | 188/1.12 |

* cited by examiner

Primary Examiner—Ramon O. Ramirez
(74) Attorney, Agent, or Firm—Skjerven Morrill MacPherson LLP

(57) ABSTRACT

A housing adapted in ordinary use to remain stationary and resist lateral movement upon a surface on which it is resting, and capable of selective facilitation of lateral movement upon such surface is disclosed. The housing has a base having a bottom in opposing relation to such surface and at least one roller mechanism contained within a mounting within the base and extending through the bottom into contact with such surface. There is at least one side wall connected to the base and extending away from such surface and an operating mechanism extending through the side wall and in operative engagement with a brake member associated with a respective one of each of the at least one roller mechanisms. The brake member has a braking position in braking engagement with the roller member and a release position not in braking engagement with the respective roller mechanism thereby allowing the roller mechanism to roll within its mounting, the operating mechanism being operative through its connection to the brake member to move the brake member from the engaging position to the release position.

5 Claims, 2 Drawing Sheets

ROLLING BASE STAND FOR COMPUTER MONITORS AND OTHER APPLIANCES

FIELD OF THE INVENTION

The present invention relates to facilitating the moveability of display monitors and the like appliances upon their mounting bases or plates over a surface upon which the base or plate is resting.

BACKGROUND OF THE INVENTION

It is common today to have desk top mounted Cathode Ray Tube ("CRT") display monitors for personal computers and the like. These are typically mounted on a stand which connects to the main part of the monitor chassis in a fashion in which the chassis is allowed to rotate about a vertical axis and swivel up and down about a horizontal axis. The base of the stand is typically flat on the bottom or hollowed out in a fashion according to the molding process forming the plastic molding of the plastic material forming the base. As the size of the monitor increases, the respective difficulty of moving the base across a desk top or across the top of a housing for a personal or mini computer becomes more difficult.

There is a need, therefore, for a mechanism for facilitating the movement of the base which is easy for the computer user to operate and is sufficient to also prevent the base from moving when movement is not desired.

DESCRIPTION OF RELATED ART

In the known art, CRTs and the like are mounted upon a base or plate which rests generally flat upon the surface on which the appliance attached thereto is resting. Friction makes movement of such an appliance across such a surface difficult, with the difficulty increasing as the appliance becomes larger. As these appliances, e.g., computer monitor CRTs, become larger and more bulky, it is more and more inconvenient to try to move them across the surface upon which their base stand or plate is resting.

SUMMARY OF THE INVENTION

It is, therefore, the aim of the present invention to provide a base stand or base plate for appliances such as computer monitors and the like which facilitates their movement when desired, but maintains the immovability of the base stand or base plate when movement is not desired.

DETAILED DESCRIPTION OF THE PREFERRED EMBODIMENTS

Figure 1:
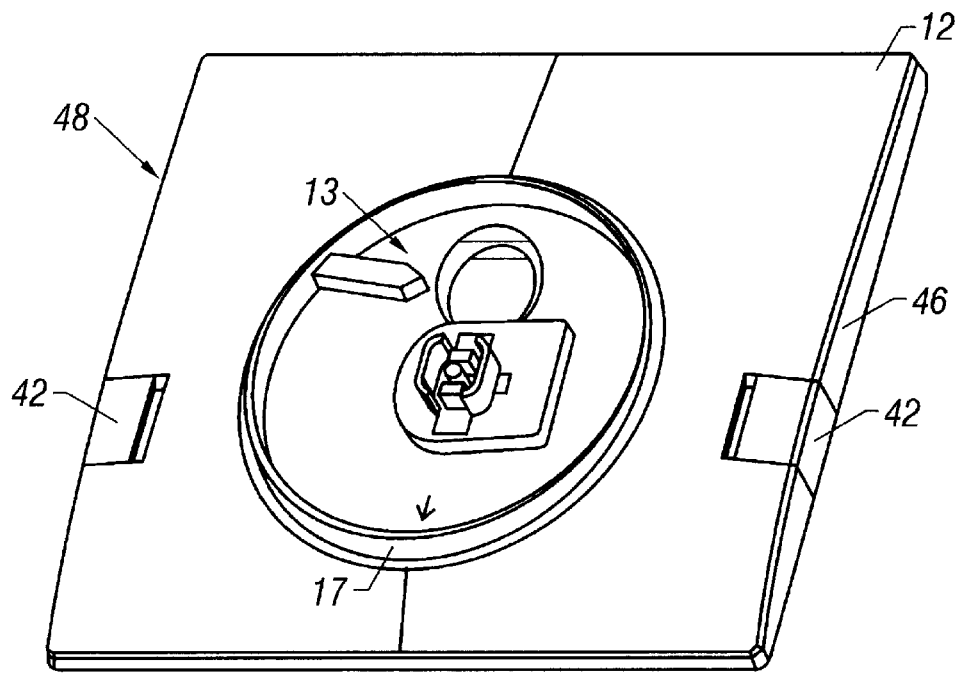
FIG. 1 shows an elevational view of a typical base stand for a computer monitor, according to the present invention.

Turning to FIG. 1, there is shown a base housing 12 for a computer monitor (not shown). A typical CRT mounting mechanism 13 is illustrated which allows connection of the CRT portion of the monitor to the base 12 by connecting the chassis and its wiring mechanisms for rotational and swivel motion as is well known in the art. The base 12 has a sidewall 46 and a sidewall 48 in which are placed operating buttons 42 as will be described below.

Figure 2:
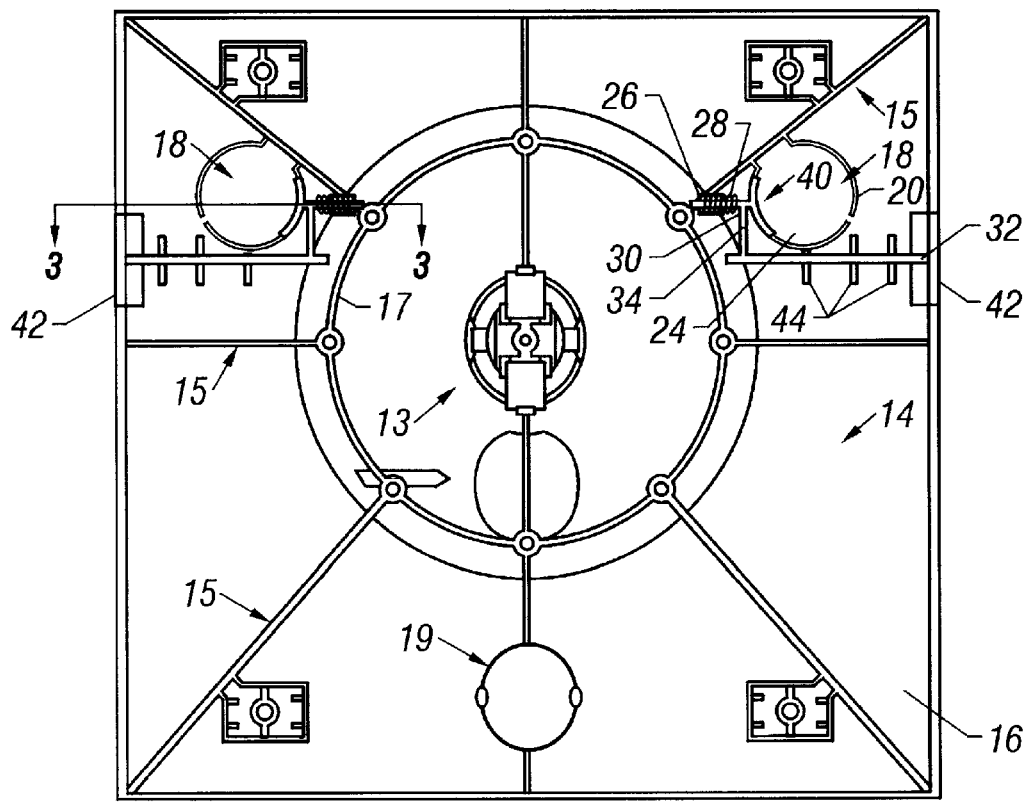
FIG. 2 shows a bottom plan view of the bottom section of the base of the computer monitor according to the current invention.

Turning now to FIG. 2, there is shown a bottom plan view of the underside 16 of the base 12. The base 12 and the underside 16 are constructed of a molded plastic as is well known in the art and contain a number of structural support members 15, extending radially from a circular flange 17, inside of which is contained the CRT mounting mechanism 13. Mounted to respective ones of such structural support members 15 are a pair of brake roller mechanisms 18.

Each of the brake roller mechanisms 18 has a circular opening 20 forming a containment ring for a roller ball 22. The roller ball 22, as is shown in more detail in FIG. 3, is mounted within a generally spherical housing 23 molded into the bottom 16.

A brake member 24 serves to hold the roller ball 22 in a position within its generally spherical housing 23.

The brake member 24 includes a brake surface 40 attached to the brake member 24. The brake member 24 is attached to an engagement rod 30 connected to a operating rod 32 which is operated by pressing the operating button 42. The brake member 24 is moved against spring action of an operating spring 28 contained in a spring housing 26. In ordinary use the operating spring 28 forces the brake surface 40 of the brake member 24 against the respective roller ball 22 to prevent the roller ball 22 from moving and, thereby keeping the base stand 12 from moving across a surface upon which it is resting at any given time.

Figure 3:
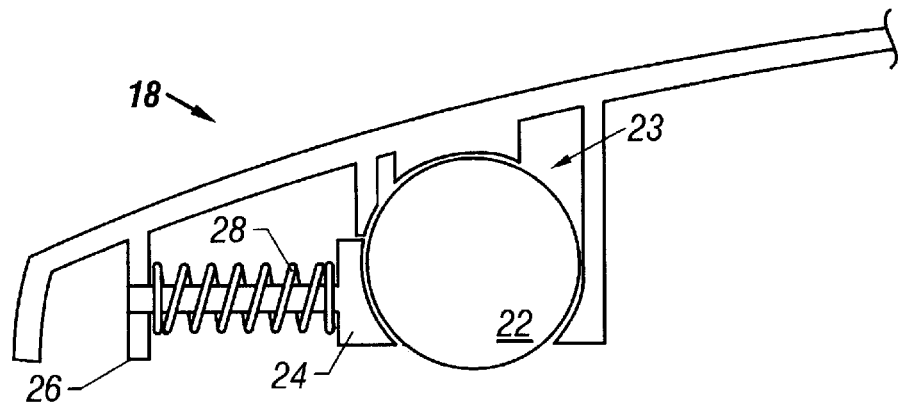
FIG. 3 shows a cross-sectional view along section A—A of the roller and braking mechanism of the present invention; and, FIG. 4 shows an exploded view of the roller and braking mechanism of the present invention.

Turning now to FIG. 3, there is shown a cross-sectional view of the roller and breaking mechanism 18 of the present invention. The brake member 24 is shown engaging the roller ball 24 under the influence of the spring pressure from operating spring 28. This presses the roller ball 22 firmly against the walls of its generally spherical housing 23 and prevents it from rotating.

Figure 4:
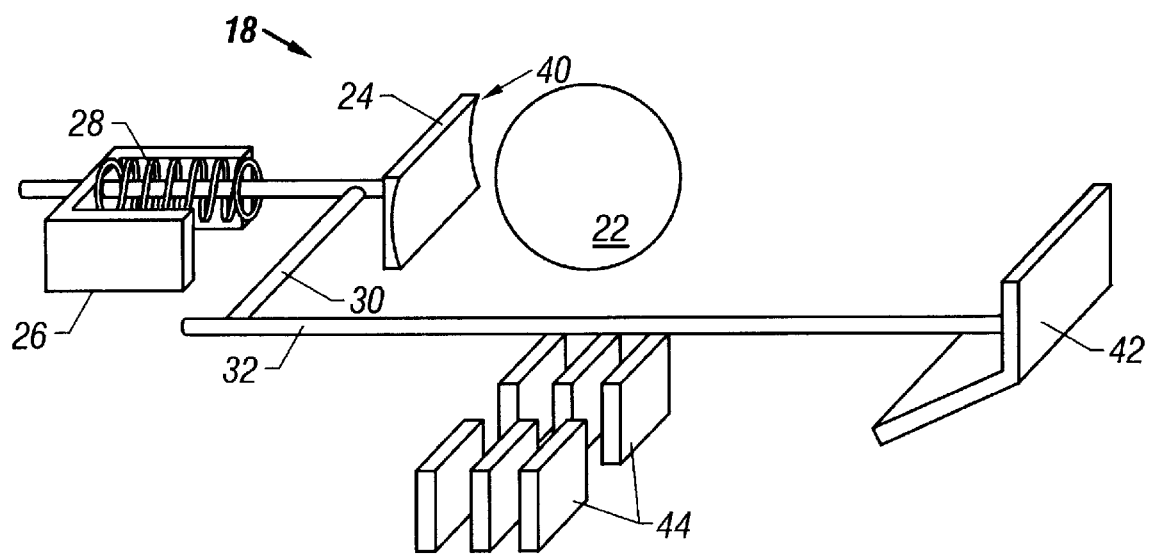

Turning now to FIG. 4, there is shown an exploded view of the roller and brake mechanism 18 of the present invention, with the element numbers as discussed in relation to FIGS. 1, 2 and 3.

In operation, the operating button 42 is depressed by someone desiring to move the base 12 which causes the braking surface 40 to disengage from the roller ball 22, allowing the roller ball to freely move. As can be seen from the view in FIG. 2, depressing both operating buttons 42 will allow both roller balls 22 to rotate simultaneously. As shown in FIG. 2, there are two housings 23 containing a roller ball 22 ordinarily confined from rolling by a brake member 24. These are conveniently in line with each other so that when it is desired to move the CRT the operator can conveniently place one hand on each side of the base 12 and grasp the base 12, while depressing inwardly the operating buttons 42 in each opposing sidewall 46,48.

There is an additional roller ball mechanism 19 containing a roller ball 22 which is without a braking mechanism and is free to roll at all times.

Turning now to FIG. 3, there is shown a cross sectional view of one of the roller ball mechanisms 18 of the present invention. It can be seen that the roller ball 22 is free to roll within the housing 23 when the brake surface 40 of the brake member 24 is forced away from the roller ball 22 by the action of the operating rod 32 moving the engagement rod 30 against the action of the spring 28. As skilled practitioners will by now understand, the present invention provides a base stand for a CRT or like appliance that effectively overcomes the problems of the prior art by preventing undesired movement of the base stand or base plate of the appliance across the surface upon which it is resting during ordinary use, while facilitating such motion with an ease of manipulability when desired to move the appliance across the surface.

Although specific preferred embodiments of the present invention have been described and illustrated for purposes of its explication, those skilled in the art will appreciate that various modifications, additions and substitutions to these embodiments are possible, depending on the particular problem at hand, without departing from the scope and spirit of the invention, as defined by the accompanying claims. For example, the appliance according to the present invention could be a television set, table top or cabinet mounted, a microwave oven or similar sized appliance. Similarly, the invention could be implemented with a single roller ball that is braked and a plurality of other roller balls that are always free to roll. In addition, the roller balls could be replaced with similar mechanisms for facilitating movement over a surface, e.g., casters or the like.

What is claimed is:

1. A housing adapted in ordinary use to remain stationary and resist lateral movement upon a surface on which it is resting, and capable of selective facilitation of lateral movement upon such surface, comprising:

a housing base having a bottom in opposing relation to such surface;

at least one roller mechanism contained within a mounting within the base and extending through the bottom into contact with such surface;

at least one side wall connected to the base and extending away from such surface; and an operating mechanism extending through the side wall and in operative engagement with a brake member associated with a respective one of each of the at least one roller mechanisms, the brake member having a braking position in braking engagement with the roller member and a release position not in braking engagement with the respective roller mechanism thereby allowing the roller mechanism to roll within its mounting, the operating mechanism being operative through its connection to the brake member to move the brake member from the engaging position to the release position.

2. The apparatus of claim 1, wherein the housing is a base member of a computer monitor.

3. The apparatus of claim 1, wherein the housing encloses an electronic household appliance.

4. The apparatus of claim 3, wherein the housing contains a counter-top television.

5. The apparatus of claim 4, wherein the housing comprises the cabinet of a cabinet-mounted television.

* * * * *